United States Patent
Ito

(10) Patent No.: US 7,408,672 B2
(45) Date of Patent: Aug. 5, 2008

(54) IMAGE PROCESSING APPARATUS, IMAGE FORMING APPARATUS AND IMAGE FORMING METHOD

(75) Inventor: Shinsaku Ito, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 996 days.

(21) Appl. No.: 10/421,738

(22) Filed: Apr. 24, 2003

(65) Prior Publication Data

US 2003/0202195 A1 Oct. 30, 2003

(30) Foreign Application Priority Data

Apr. 24, 2002 (JP) .............................. 2002-122516

(51) Int. Cl.
*G06F 15/00* (2006.01)
(52) U.S. Cl. .................... 358/1.2; 358/1.9; 358/2.1; 358/3.21; 358/3.26; 358/3.27; 358/451; 358/462; 382/199; 382/258; 382/266; 382/269; 382/274; 382/275; 382/298; 382/299
(58) Field of Classification Search .................. 358/1.2, 358/1.9, 2.1, 3.21, 3.26, 3.27, 451, 462; 382/199, 382/258, 266, 269, 274, 275, 298, 299
See application file for complete search history.

(56) References Cited

U.S. PATENT DOCUMENTS

| | | | | |
|---|---|---|---|---|
| 5,124,751 A * | 6/1992 | Fukui et al. | ..................... | 399/44 |
| 5,825,942 A * | 10/1998 | Miyaza | ........................ | 382/298 |
| 6,278,513 B1 * | 8/2001 | Murata et al. | .................. | 355/44 |
| 6,490,057 B1 * | 12/2002 | Sakaguchi | ................... | 358/412 |
| 6,671,395 B1 * | 12/2003 | Ott et al. | ...................... | 382/137 |
| 6,934,057 B1 * | 8/2005 | Namizuka | .................... | 358/2.1 |
| 7,046,395 B2 * | 5/2006 | Ito | .............................. | 358/1.9 |
| 2002/0093671 A1 * | 7/2002 | Ohno | .......................... | 358/1.9 |

FOREIGN PATENT DOCUMENTS

| | | |
|---|---|---|
| JP | 6-024043 A | 2/1994 |
| JP | 2000-032255 A | 1/2000 |
| JP | 2002-094781 A | 3/2002 |

* cited by examiner

*Primary Examiner*—David K Moore
*Assistant Examiner*—Mark R Milia
(74) *Attorney, Agent, or Firm*—Foley & Lardner LLP

(57) ABSTRACT

When a print key on a console panel is depressed, a main CPU confirms enlargement/reduction rate information input via the console panel, and then, performs line thinning by setting a line thinning parameter according to the same magnification, an enlargement rate or a reduction rate in a line thinning processing unit in an image processing apparatus.

6 Claims, 5 Drawing Sheets

$$\begin{pmatrix} -1 & 0 & 1 \\ -3 & 0 & 3 \\ -1 & 0 & 1 \end{pmatrix}$$
FIG. 5
$$\begin{pmatrix} -1 & -3 & -1 \\ 0 & 0 & 0 \\ 1 & 3 & 1 \end{pmatrix}$$
FIG. 6
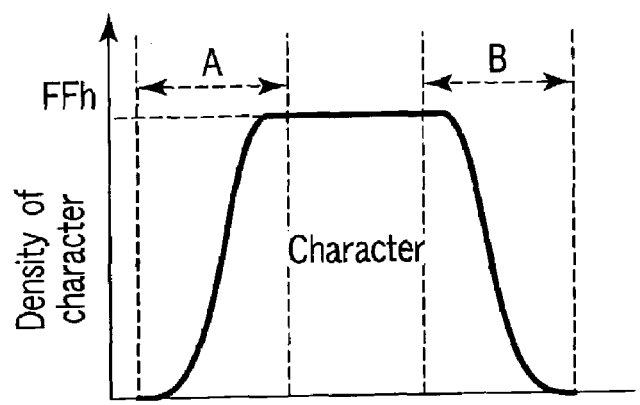
FIG. 7
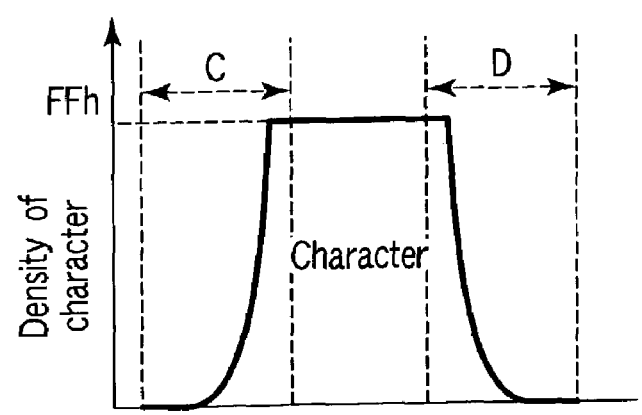
FIG. 8

IMAGE PROCESSING APPARATUS, IMAGE FORMING APPARATUS AND IMAGE FORMING METHOD

CROSS-REFERENCE TO RELATED APPLICATIONS

This application is based upon and claims the benefit of priority from the prior Japanese Patent Application No. 2002-122516, filed Apr. 24, 2002, the entire contents of which are incorporated herein by reference.

BACKGROUND OF THE INVENTION

1. Field of the Invention

The present invention relates to an image processing apparatus for reading an image of, for example, a document by a scanner so as to process data on the read image, an image forming apparatus provided with the image processing apparatus, for forming an image, and an image forming method.

2. Description of the Related Art

In a copying machine, a printing rate is one of factors of determining toner consumption per sheet of transfer paper. The printing rate is a value determined by a printing area of a copying image in a specific evaluation chart, and it is greatly relevant to the number of dots of an image to be formed in an image forming unit. Therefore, it is possible to reduce the number of dots of the image by narrowing the width of a line of a character or the like by image processing. Consequently, the reduction of the printing rate by narrowing the width of the line by the image processing is effective in saving the toner consumption.

A line has been conventionally thinned (in other words, the width of a line has been conventionally controlled) (with respect to binary image data) after pseudo gradation processing such as error diffusion. A method for identifying an edge and a non-edge in image data has been performed by matching with a template pattern prepared in advance.

However, there has been a limit to identifying accuracy as long as the binary image data after the gradation processing has been processed, and therefore, there may be some identifying errors here and there, thereby degrading a quality of an image. Furthermore, there has arisen a problem in reducing or enlarging the image data. In the case of the reduction, the size of an output image such as a character or a thin line has become small, thereby causing a trouble such as faint printing. In contrast, in the case of the enlargement, the size of an output image such as a character or a thin line has become large, thereby causing a trouble of deterioration of a line thinning effect.

BRIEF SUMMARY OF THE INVENTION

An object of the present invention is to provide an image processing apparatus, an image forming apparatus and an image forming method, in which the accuracy of identifying an edge and a non-edge in image data can be enhanced, and further, a line can be thinned without degrading a quality of an image even in the case of reduction or enlargement of the image data.

In order the achieve the above-described object, according to the present invention, there is provided an image forming apparatus for reading an image of a document, so as to form an image by subjecting the read image data to image processing, comprising: a storage unit which stores a plurality of line thinning arguments; a setting unit which sets an enlargement rate or a reduction rate with respect to the image data; a selecting unit which selects the line thinning argument corresponding to the enlargement rate or the reduction rate set by the setting unit from the storage unit; an enlarging/reducing unit which enlarges or reduces the image data at the enlargement rate or the reduction rate set by the setting unit; and a line thinning processing unit which thins a line of the image data by the use of the line thinning argument selected by the selecting unit.

According to the present invention, there is provided an image processing apparatus for subjecting supplied image data to image processing, comprising: an enlarging/reducing unit which, when an enlargement rate or a reduction rate with respect to the supplied image data is set, enlarges or reduces the image data at the set enlargement rate or reduction rate; and a line thinning processing unit which thins a line of the image data enlarged or reduced by the enlarging/reducing unit by the use of a line thinning argument corresponding to the enlargement rate or the reduction rate.

According to the present invention, there is provided an image forming method in an image forming apparatus for reading an image of a document, so as to form an image by subjecting the read image data to image processing, comprising: storing a plurality of line thinning arguments; setting an enlargement rate or a reduction rate with respect to the image data; selecting a line thinning argument corresponding to the set enlargement rate or reduction rate from a plurality of line thinning arguments stored in advance; enlarging or reducing the image data at the set enlargement rate or reduction rate; and thinning a line of the enlarged or reduced image data by the use of the selected line thinning argument.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIG. 5 is a diagram illustrating an example of a first-order differential filter;

FIG. 6 is a diagram illustrating another example of the first-order differential filter;

FIG. 7 is a graph illustrating density conversion;

FIG. 8 is a graph illustrating the density conversion; and

DETAILED DESCRIPTION OF THE INVENTION

An embodiment according to the present invention will be described below in reference to the accompanying drawings.

Figure 1:
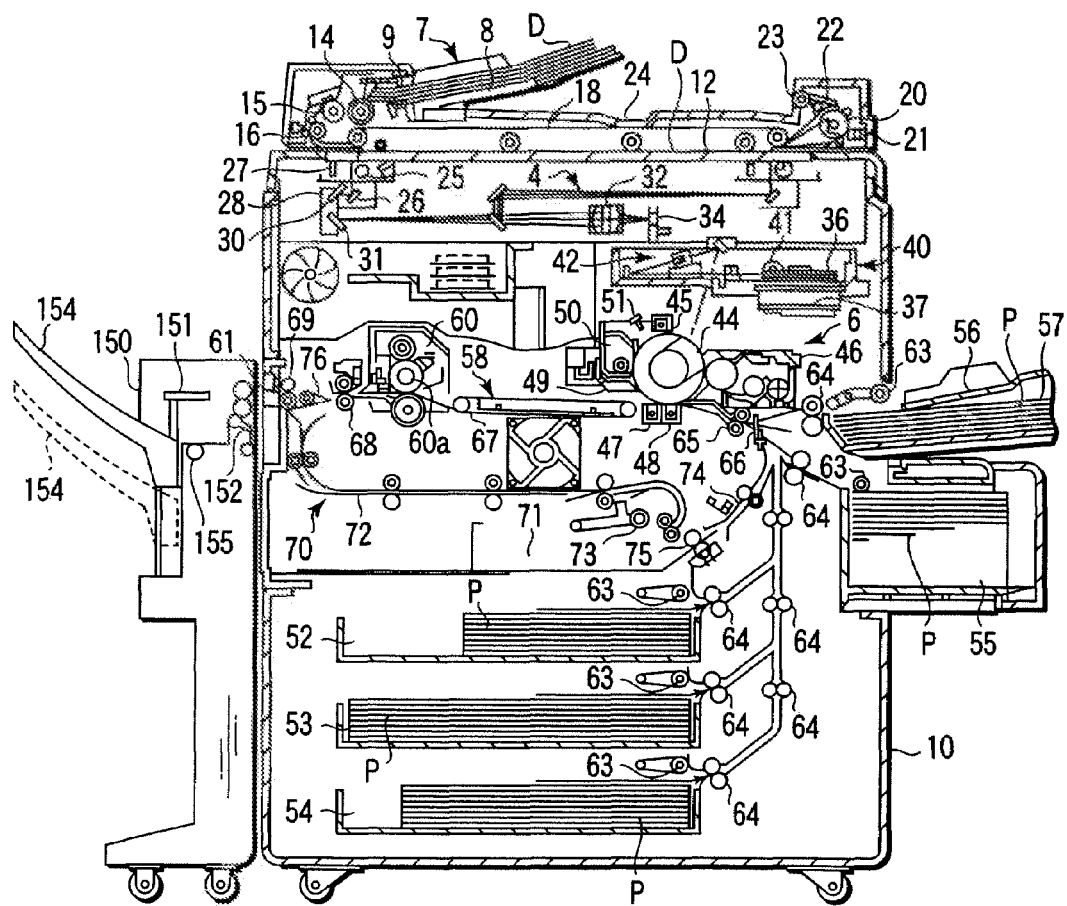
FIG. 1 is a cross-sectional view showing the inside structure of a digital copying machine in an image forming apparatus according to the present invention.

FIG. 1 is a cross-sectional view showing the inside structure of a digital copying machine (or a digital plain paper copier abbreviated as "a DPPC") in an image forming apparatus according to the present invention.

As shown in FIG. 1, the digital copying machine is provided with an apparatus body 10, which includes therein a scanner unit 4 functioning as an image reading unit and a printer unit 6 functioning as an image forming unit.

At the upper surface of the apparatus body 10, there is provided a document placing table 12 made of transparent glass, on which an object to be read, that is, a document D is placed. Furthermore, at the upper surface of the apparatus body 10 is disposed an automatic document feeder 7 (hereinafter abbreviated as "an ADF") for automatically feeding the document onto the document placing table 12. The ADF 7 is disposed in such a manner as to be freely opened or closed with respect to the document placing table 12, and functions also as a document presser which brings the document D placed on the document placing table 12 into close contact with the document placing table 12.

The ADF 7 includes a document tray 8, on which the document D is set; an empty sensor 9 for detecting the existence of the document; a pick-up roller 14 for taking out the documents one by one from the document tray 8; a sheet feed roller 15 for conveying the taken-out document; a pair of aligning rollers 16 for aligning the tips of the documents; and a conveyor belt 18 stretched in such a manner as to cover substantially the entire document placing table 12. The plurality of documents set on the document tray 8 in upward orientation are taken out in sequence from a lowermost page, i.e., a final page, to be aligned by the pair of aligning rollers 16, and then, are conveyed to a predetermined position on the document placing table 12 by the conveyor belt 18.

In the ADF 7, a reverse roller 20, a non-reverse sensor 21, a flapper 22 and a sheet discharge roller 23 are disposed at an end on a side opposite to the pair of aligning rollers 16 with respect to the conveyor belt 18. The document D whose image data is read by the scanner unit 4, described later, is fed from above the document placing table 12 via the conveyor belt 18, and then, is discharged onto a document discharge portion 24 at the upper surface of the ADF 7 via the reverse roller 20, the flapper 21 and the sheet discharge roller 23. In the case where the reverse of the document is read, the document D conveyed via the conveyor belt 18 is reversed by means of the reverse roller 20 by switching the flapper 22, and then, is fed again to the predetermined position on the document placing table 12 via the conveyor belt 18.

The scanner unit 4 included inside of the apparatus body 10 has an exposure lamp 25 serving as a light source for illuminating the document D placed on the document placing table 12 and a first mirror 26 for deflecting a light beam reflected on the document D in a given direction. The exposure lamp 25 and the first mirror 26 are fixed to a first carriage 27 disposed under the document placing table 12.

The first carriage 27 is disposed in such a manner as to be freely moved in parallel to the document placing table 12, and is reciprocated under the document placing table 12 via a toothed belt or the like, not shown, by a scanning motor, not shown.

Moreover, a second carriage 28 is disposed under the document placing table 12 in such a manner as to be freely moved in parallel to the document placing table 12. To the second carriage 28 are fixed, in a manner perpendicular to each other, a second mirror 30 and a third mirror 31 for sequentially deflecting the light beam reflected on the document D and deflected by the first mirror 26. The second carriage 28 is driven with respect to the first carriage 27 by a toothed belt or the like for driving the first carriage 27, and further, is moved with respect to the first carriage 27 in parallel along the document placing table 12 at a half speed.

Additionally, under the document placing table 12 are disposed a focusing lens 32 for focusing the light beam reflected on the third mirror 31 on the second carriage 28 and a CCD (i.e., an optoelectronic transducer element) 34 for receiving and optoelectronically transducing the reflection light beam focused by the focusing lens. The focusing lens 32 is movably arranged via a drive mechanism within a plane including the optical axis of the light beam deflected by the third mirror 31, and focuses the reflection light beam at a desired magnification in accordance with its own movement. The CCD 34 optoelectronically transduces the incident reflection light beam, and then, outputs an electric signal corresponding to the read document D.

In the meantime, the printer unit 6 is provided with a laser exposure device 40 functioning as latent image forming means. The laser exposure device 40 includes a semiconductor laser 41 serving as a light source; a polygon mirror 36 serving as a scanning member for continuously deflecting a laser beam emitted from the semiconductor laser 41; a polygon motor 37 serving as a scanning motor for rotatably driving the polygon mirror 36 at a predetermined rotating speed; and an optical system 42 for deflecting the laser beam emitted from the polygon mirror 36 and introducing it to a photosensitive drum 44, described later. The laser exposure device 40 such configured as described above is securely supported by a support frame, not shown, in the apparatus body 10.

The semiconductor laser 41 is controlled to be turned on or off according to image data on the document D read by the scanner unit 4, information on a document transmitted or received by a facsimile, or the like. The laser beam from the semiconductor laser 41 is directed to the photosensitive drum 44 via the polygon mirror 36 and the optical system 42, scans the circumferential surface of the photosensitive drum 44, and thus, forms an electrostatic latent image on the circumferential surface of the photosensitive drum 44.

Specifically, the printer unit 6 includes the rotatable photosensitive drum 44 serving as an image carrier located at substantially the center of the apparatus body 10. The circumferential surface of the photosensitive drum 44 is exposed to a light beam emitted from the laser exposure device 40, so that a desired electrostatic latent image can be formed. Around the photosensitive drum 44, there are integrally provided a charger 45 for charging the circumferential surface of the drum with a given electric charge; a developing device 46 for supplying a toner as a developer to the electrostatic latent image formed at the circumferential surface of the photosensitive drum 44, so as to develop the latent image at a desired image density; and a peeling charger 47 for separating a transfer medium fed from a sheet cassette, described later, that is, a copying sheet P from the photo-sensitive drum 44. Moreover, around the photosensitive drum 44, there are provided in order a transfer charger 48 for transferring the toner image formed on the photosensitive drum 44 onto the sheet P; a peeling pawl 49 for peeling the copying sheet P from the circumferential surface of the photosensitive drum 44; a cleaner 50 for cleaning the toner remaining at the circumferential surface of the photosensitive drum 44; and a discharger 51 for discharging the circumferential surface of the photosensitive drum 44.

In the lower section inside of the apparatus body 10, an upper cassette 52, an intermediate cassette 53 and a lower cassette 54, each of which can be drawn from the apparatus body, are arranged in a laminated state. Copying sheets of different sizes are loaded in the cassettes, respectively. Sideways of these cassettes is disposed a large-capacity feeder 55, in which about 3,000 pieces of copying sheets P of a size of a high use frequency, e.g., of an A4 size can be contained. Above the large-capacity feeder 55 is detachably attached a sheet feed cassette 57 also serving as a manual feed tray 56.

Inside of the apparatus body 10, there is defined a conveying path 58 extending from the cassettes and the large-capacity feeder 55 through a transfer unit interposed between the photosensitive drum 44 and the transfer charger 48. To the terminal end of the conveying path 58 is disposed a fixing device 60 having a fixing lamp 60a. A discharge port 61 is formed on the side wall of the apparatus body 10, facing to the fixing device 60. To the discharge port 61 is attached a finisher 150 having a single tray.

In the vicinity of each of the upper cassette 52, the intermediate cassette 53, the lower cassette 54, the sheet feed cassette 57 and the large-capacity feeder 55, there is provided a pick-up roller 63 for taking out the sheets P one by one from each of the cassettes and large-capacity feeder. In addition, numerous pairs of sheet feed rollers 64 for conveying the copying sheet P taken by the pick-up rollers 63 on the conveying path 58 are provided on the conveying path 58.

On the conveying path 58, a pair of registration rollers 65 are disposed upstream of the photosensitive drum 44. The pair of registration rollers 65 are adopted to correct the inclination of the taken-out copying sheet P, to register the tip of the toner image formed on the photosensitive drum 44 with the tip of the copying sheet P, and to feed the copying sheet P to the transfer unit at the same speed as a movement speed of the circumferential surface of the photosensitive drum 44. Before the pair of registration rollers 65, that is, on the side of the sheet feed rollers 64, there is provided a sensor 66 before alignment for detecting the reach of the copying sheet P.

The copying sheets P taken one by one from each of the cassettes and the large-capacity feeder 55 by the pick-up roller 63 are fed to the pair of registration rollers 65 by the pair of sheet feed rollers 64. Thereafter, the tips of the copying sheets P are registered by the pair of registration rollers 65, and then, are fed to the transfer unit.

In the transfer unit, the developer image formed on the photosensitive drum 44, that is, the toner image is transferred onto the copying sheet P by the transfer charger 48. The copying sheet P having the toner image transferred thereonto is separated from the circumferential surface of the photosensitive drum 44 by the effect of the peeling charger 47 and the peeling pawl 49, and then, is conveyed to the fixing device 60 via another conveyor belt 67 constituting a part of the conveying path 58. After the developer image is molten and fixed onto the copying sheet P by the fixing device 60, the copying sheet P is discharged onto the finisher 150 through the discharge port 61 by a pair of sheet feed rollers 68 and a pair of sheet discharge rollers 69.

Under the conveying path 58, there is provided an automatic double side device 70 for reversing the copying sheet P passing through the fixing device 60 and feeding it again to the pair of registration rollers 65. The automatic double side device 70 includes a temporary accumulating unit 71 for temporarily accumulating the copying sheets P; a reversing path 72 branched from the conveying path 58, for reversing the copying sheet P passing through the fixing device 60 and introducing it to the temporary accumulating unit 71; a pick-up roller 73 for taking one by one the copying sheets P accumulated in the temporary accumulating unit 71; and a sheet feed roller 75 for feeding the taken-out sheet to the pair of registration rollers 65 on a conveying path 74. At the branch portion of the reversing path 72 from the conveying path 58, an assigning gate 76 is provided for selectively assigning the copying sheet P to the discharge port 61 or the reversing path 72.

In performing double-sided copying, the copying sheet P passing through the fixing device 60 is introduced onto the reversing path 72 at the assigning gate 76, and then, is temporarily accumulated in the temporary accumulating unit 71 in the reversed state, and thereafter, is fed to the pair of registration rollers 65 on the conveying path 74 by the pick-up roller 73 and the pair of sheet feed rollers 75. After the copying sheet P is registered by the pair of registration rollers 65, and then, is fed again to the transfer unit, in which the toner image is transferred onto the reverse of the copying sheet P. Thereafter, the copying sheet P is discharged to the finisher 150 via the conveying path 58, the fixing device 60 and the sheet discharge rollers 69.

The finisher 150 staples a set of discharged documents per set unit, and stacks it thereon. Every time one of the copying sheets P to be stapled is discharged from the discharge port 61, the copying sheet P is shifted for the registration onto a stapling side by a guide bar 151. When all of the copying sheets P are completed to be discharged, a sheet pressing arm 152 presses the discharged copying sheets P per set unit while a stapler unit (not shown) staples the copying sheets P. Thereafter, the guide bar 151 is descended, and thus, the stapled copying sheets P are discharged per set unit to a finisher discharge tray 154 by a finisher discharge roller 155. A descending quantity of the finisher discharge tray 154 is determined to some extent according to the number of copying sheets P to be discharged. That is, the finisher discharge tray 154 is descended stepwise every discharging per set unit. Moreover, the guide bar 151 for registering the discharged copying sheets P is located at such a height as not to abut against the copying sheets P stapled already on the finisher discharge tray 154.

Furthermore, the finisher discharge tray 154 is connected to a shift mechanism, not shown, which shifts (for example, in four directions, i.e., forward, backward, rightward and leftward) per set in a sort mode.

Additionally, at the upper portion of the front surface of the apparatus body 10, there is provided a console panel 80, by which various copying conditions and a copy starting signal for starting a copying operation are input.

Figure 2:
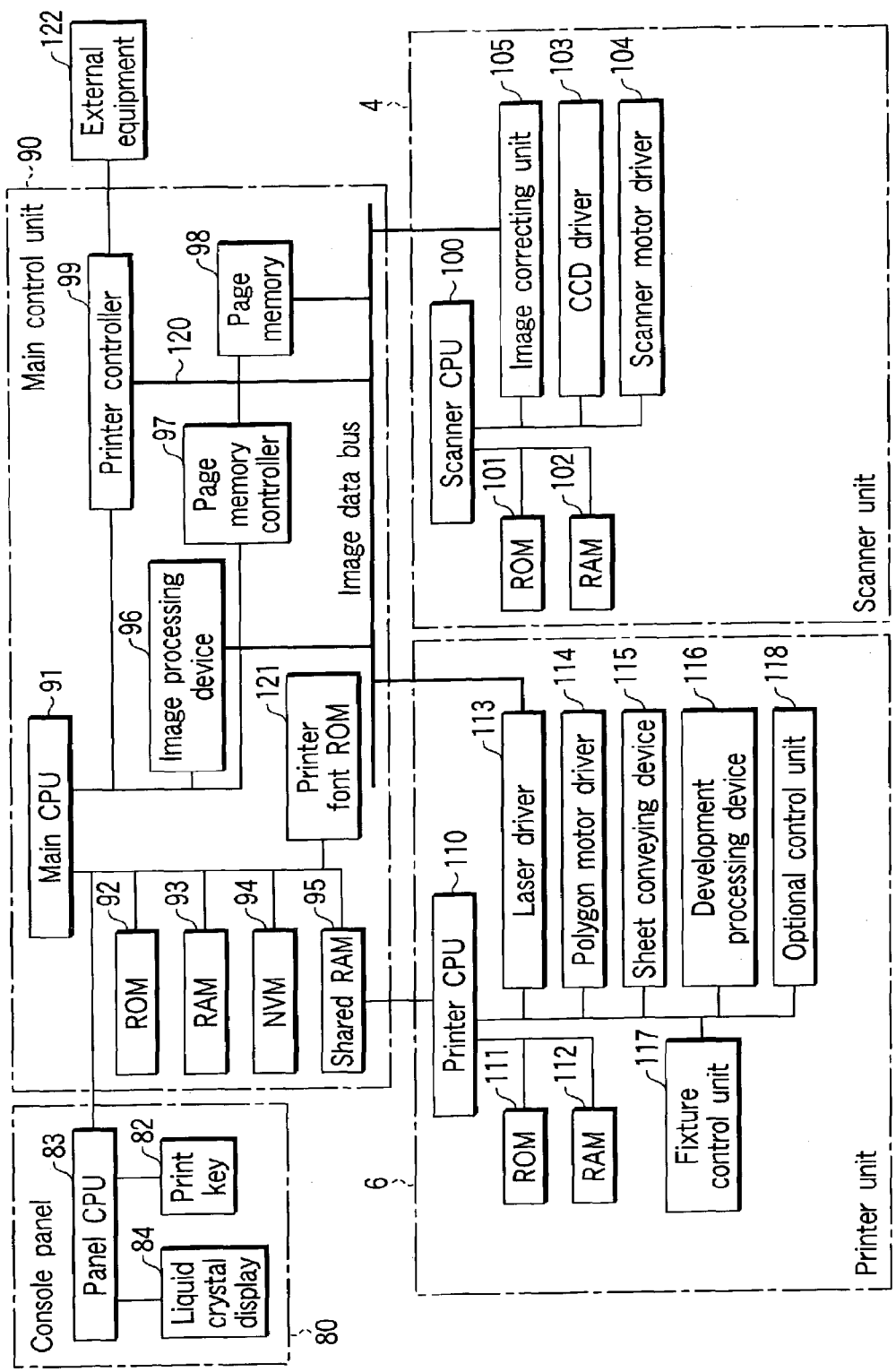
FIG. 2 is a block diagram illustrating the schematic configuration of the digital copying machine.

FIG. 2 is a block diagram schematically illustrating electric connection in the digital copying machine shown in FIG. 1 and a flow of a signal for control. Referring to FIG. 2, the digital copying machine comprises three CPUs, i.e., a main CPU 91 inside of a main control unit 90, a scanner CPU 100 in the scanner unit 4 and a printer CPU 110 in the printer unit 6. The main CPU 91 performs interactive communications via the printer CPU 110 and a shared RAM 95, wherein the main CPU 91 outputs an operation instruction; in contrast, the printer CPU 110 returns a status. The printer CPU 110 and the scanner CPU 100 perform serial communications, wherein the printer CPU 110 outputs an operation instruction; in contrast, the scanner CPU 100 returns a status.

The console panel 80 is connected to the main CPU 91.

The main control unit 90 includes the main CPU 91, a ROM 92, a RAM 93, an NVM 94, the shared RAM 95, an image processing device 96, a page memory controller 97, a page memory 98, a printer controller 99 and a printer font ROM 121.

The main CPU 91 is adopted to control the entire main control unit 90. The ROM 92 stores a control program therein. The RAM 93 temporarily stores data therein.

The NVM (i.e., the non-volatile RAM) 94 is a non-volatile memory which is backed up by a battery (not shown) and therefore, data stored in the NVM 94 can be held even if a power source is turned off. Incidentally, the NVM 94 stores therein a plurality of line thinning parameters (such as arguments or medium variables), as described later.

The shared RAM 95 is used for performing the interactive communications between the main CPU 91 and the printer CPU 110.

The page memory controller 97 is adapted to store or read the image data in or from the page memory 98. The page memory 98 has a region, in which image data on a plurality of pages can be stored, and is configured in such a manner as to freely store, every page, compressed image data transmitted from the scanner unit 4.

The printer font ROM 121 stores therein font data corresponding to print data.

The printer controller 99 is adopted to develop the print data transmitted from external equipment 122 such as a personal computer into image data at a resolution according to the data representing a resolution assigned to the above-described print data by the use of the font data stored in the printer font ROM 121.

The scanner unit 4 includes the scanner CPU 100 for controlling the entire scanner unit 4; a ROM 101 storing a control program or the like therein; a data storing RAM 102; a CCD driver 103 for driving the CCD sensor 34; a scanner motor driver 104 for controlling the rotation of the motor for moving the exposure lamp 25, the mirrors 26, 27 and 28 and the like; and an image correcting unit 105 constituted of an A/D converter circuit for converting an analog signal transmitted from the CCD sensor 34 into a digital signal, a shading correction circuit for correcting a fluctuation of a threshold level with respect to an output signal from the CCD sensor 34, which is caused by a fluctuation of the CCD sensor 34 or a change in ambient temperature, and a line memory for temporarily storing a digital signal, which has been subjected to shading correction, transmitted from the shading correction circuit.

The printer unit 6 includes the printer CPU 110 for controlling the entire printer unit 6; a ROM 111 storing a control program or the like therein; a data storing RAM 112; a laser driver 113 for turning on or off the light emission by the semiconductor laser 41; a polygon motor driver (i.e., a motor controller) 114 for controlling the rotation of the polygon motor 37 in the laser unit 40; a sheet conveying device 115 for controlling the conveyance of the sheet P on the conveying path 58; a development processing device 116 for performing charging, developing and transferring by the use of the charger 45, the developing device 46 and the transfer charger 48, respectively; a fixture control unit 117 for controlling the fixing device 60; and an optional control unit 118.

The image processing device 96, the pager memory 98, the printer controller 99, the image correcting unit 105 and the laser driver 113 are connected via an image data bus 120.

The console panel 80 includes a print key 82, a panel CPU 83 and a liquid crystal display 84. The liquid crystal display 84 is provided with a touch panel, via which various kinds of setting can be input. Incidentally, the enlargement or the reduction is set via the liquid crystal display 84, as described later.

Figure 3:
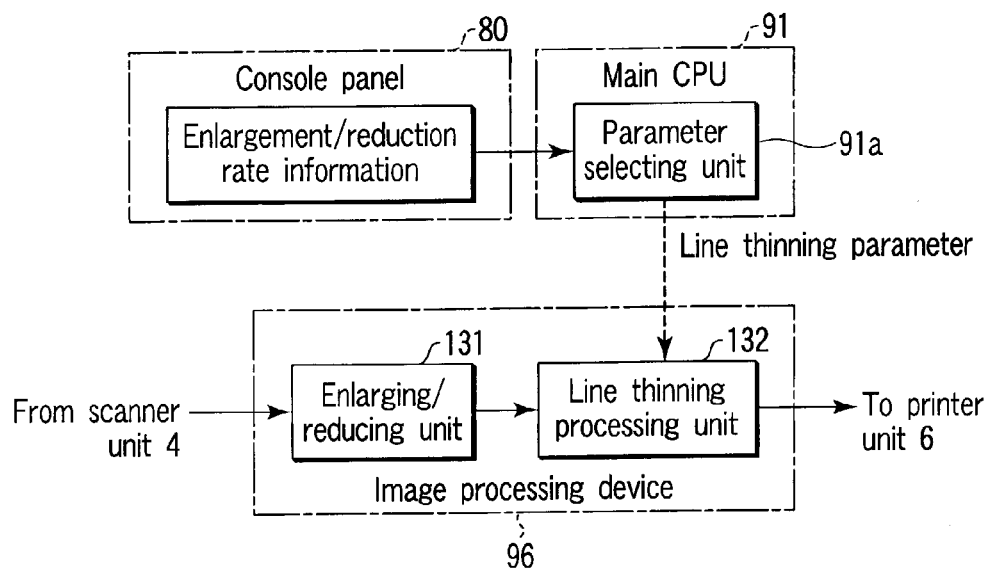
FIG. 3 is a block diagram illustrating the configuration of essential parts according to the present invention.

FIG. 3 is a block diagram illustrating the configuration of essential parts according to the present invention. In FIG. 3, the essential parts are principally the console panel 80, the main CPU 91 and the image processing device 96.

The panel CPU 83 in the console panel 80 transmits enlargement/reduction rate information input via the liquid crystal display 84 to the main CPU 91.

The main CPU 91 includes a parameter selecting unit 91a. The parameter selecting unit 91a selects one of a plurality of line thinning parameters stored in the NVM 94 according to the enlargement/reduction rate information input via the console panel 80, and then, sets the selected line thinning parameter in a line thinning processing unit 132 in the image processing device 96.

The image processing device 96 is constituted of an enlarging/reducing unit 131 and the line thinning processing unit 132. The main CPU 91 controls the enlarging/reducing unit 131, so as to enlarge or reduce the image data input by the scanner unit 4. The line thinning processing unit 132 thins the line of a character.

Figure 4:
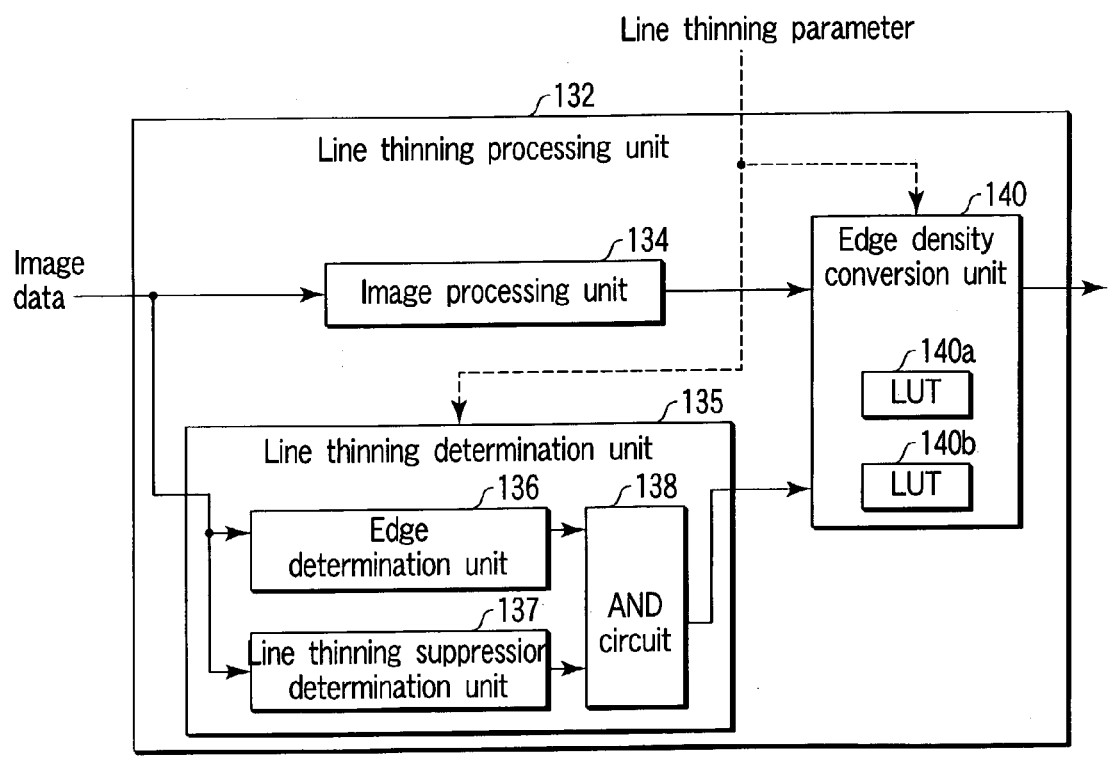
FIG. 4 is a block diagram illustrating a constitutional example of a line thinning processing unit.

FIG. 4 is a block diagram illustrating a constitutional example of the line thinning processing unit 132. Specifically, the line thinning processing unit 132 includes an image processing unit 134, a line thinning determination unit 135 and an edge density conversion unit 140.

The image processing unit 134 performs arbitrary image processing such as smoothing processing.

The line thinning determination unit 135 detects an edge by input filter processing.

The line thinning determination unit 135 includes an edge determination unit 136, a line thinning suppression determination unit 137 and an AND circuit 138.

The edge determination unit 136 determines whether or not an edge quantity (i.e., an inclination) calculated on a target pixel in the image data to be input by the scanner unit 4 is a predetermined threshold or larger, and then, outputs an edge determination identifying signal as the determination result. In the case where the calculated edge quantity (i.e., the calculated inclination) is the predetermined threshold or larger, the edge determination unit 136 determines that the target pixel is the edge, so as to output a signal value "1". The region (i.e., the pixel) to be determined as the edge is increased or decreased by varying the threshold, so that the line thinning degree is adjusted.

In the case where a filter as the line thinning parameter set by the parameter selecting unit 91a in the main CPU 91 is a first-order differential filter, the edge determination unit 136 performs the determination in any of four directions in total, that is, a main scanning direction, a sub scanning direction and two slantwise directions, and then, performs OR calculation of each of the determination results, so as to output an edge determination identifying signal.

FIGS. 5 and 6 are diagrams illustrating examples of the first-order differential filter.

The line thinning suppression determination unit 137 detects a low frequency region in such a manner as to prevent any degradation of the quality of the image caused by the excessive line thinning processing, and thus, does not perform any line thinning processing.

In other words, the line thinning suppression determination unit 137 determines whether or not the image data input by the scanner unit 4 is to be suppressed from the line thinning based on the line thinning parameter set by the parameter selecting unit 91a in the main CPU 91, and then, outputs a line thinning suppression determining signal as the determination result.

The line thinning suppression determination unit 137 obtains a maximum and a minimum among 3×3 pixels, that is, the target pixel and eight pixels around the target pixel in the image data input by the scanner unit 4, and calculates a difference between the maximum and the minimum for comparison with a predetermined threshold. As a result, in the case where the difference is smaller than the threshold, the line thinning suppression determination unit 137 determines that the region is low in frequency (or MTF), and then, outputs a signal value "0" as a (non-edge) pixel to be suppressed from the line thinning.

The AND circuit 138 performs AND calculation (i.e., obtains a logical multiplication) between an edge determination identifying signal from the edge determination unit 136 and a line thinning suppression determining signal from the line thinning suppression determination unit 137, and outputs a final line thinning determination identifying signal ("1" in the case of the edge; in contrast, "0" in the case of the non-edge).

The edge density conversion unit 140 includes a look-up table (hereinafter abbreviated as "an LUT") 140a and another look-up table (hereinafter also abbreviated as "an LUT") 140b. In the LUTs 140a and 140b, a table setting value is varied according to the same magnification, reduction or enlargement by the parameter selecting unit 91a in the main CPU 91.

The edge density conversion unit 140 outputs the image data input in reference to the LUT 140a after density conversion in the case where the line thinning determination identifying signal is "1", that is, the pixel is identified as the edge; in contrast, it outputs the image data input in reference to the LUT 140b after density conversion in the case where the line thinning determination identifying signal is "0", that is, the pixel is identified as the non-edge.

That is, the edge density conversion unit 140 converts the density (i.e., reduces the output density) in reference to the LUT 140a with respect to the pixel which is determined as the edge based on the line thinning determination identifying signal transmitted from the line thinning determination unit 135.

FIGS. 7 and 8 are graphs illustrating examples of the density conversion. Edges A and B of a character in FIG. 7 are converted into edges C and D of the character as illustrated in FIG. 8, respectively. Here, the degree of the line thinning processing can be adjusted by varying the table setting value in the LUT 140a.

Here, the image data as a target of the edge density conversion by the edge density conversion unit 140 may not be the same as that input into the line thinning determination unit 135. For example, the image data may be image data subjected to arbitrary image processing such as smoothing processing by a low pass filter (abbreviated as "an LPF") in the image processing unit 134.

In thickening a line, the edge density conversion unit 140 converts the density (i.e., increases the output density) in reference to the LUT 140a with respect to the pixel which is determined as the edge based on the line thinning determination identifying signal transmitted from the line thinning determination unit 135. In the same manner as described above, the degree of the line thickening processing can be adjusted by varying the table setting value in the LUT 140a.

Here, schematic explanation will be made below on the principal control according to the present invention.

In FIG. 3, when the input image is output after the reduction or the enlargement, the parameter selecting unit 91a in the main CPU 91 selects the line thinning parameter according to the reduction rate or the enlargement rate, and then, sets it in the line thinning processing unit 132.

Here, the line thinning parameters selected according to the reduction rate or the enlargement rate include the filter value and the threshold set in the edge determination unit 136, the filter value and the threshold set in the line thinning suppression determination unit 137 and the table setting values set in the LUT 140a and the LUT 140b in the edge density conversion unit 140.

When the input image is output after the reduction, the threshold for use in the edge determination by the edge determination unit 136 is hardly determined as the edge by setting a value greater than that at the time of the same magnification, thereby reducing the line thinning degree. Otherwise, without varying the edge determination result of the edge determination unit 136, the table setting value for converting the density to a lower level in comparison with the table setting value at the time of the same magnification is set in the LUT 140a in the edge density conversion unit 140, thereby reducing the line thinning degree.

In contrast, when the input image is output after the enlargement, the threshold for use in the edge determination by the edge determination unit 136 is set to a value smaller than that at the time of the same magnification. Or, the table setting value for converting the density to a higher level in comparison with the table setting value at the time of the same magnification is set in the LUT 140a in the edge density conversion unit 140, thereby increasing the line thinning degree.

When there is a level difference in resolution between in the main scanning direction and in the sub scanning direction, the parameter selecting unit 91a in the main CPU 91 can independently set different line thinning parameters.

Figure 9:
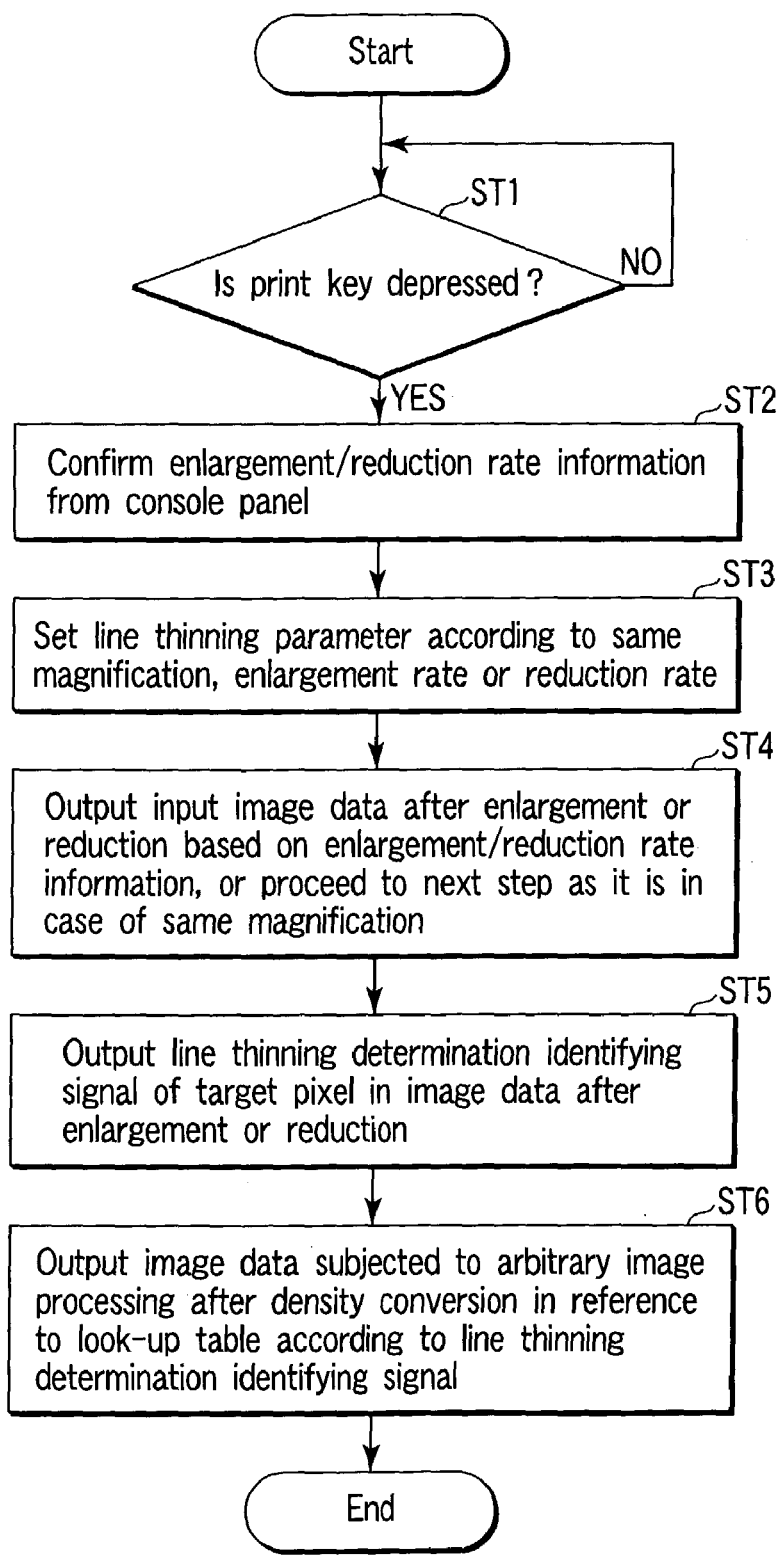
FIG. 9 is a flowchart illustrating an image processing operation in the digital copying machine.

Next, with the above-described arrangement, an image processing operation in the digital copying machine will be explained in reference to a flowchart illustrated in FIG. 9.

First, when the print key 82 on the console panel 80 is depressed (ST1), the main CPU 91 confirms the enlargement/reduction rate information input via the console panel 80 (ST2).

In step ST2, the parameter selecting unit 91a in the main CPU 91 sets the line thinning parameter according to the same magnification, the enlargement rate or the reduction rate in the line thinning processing unit 132 in the image processing device 96 (ST3).

For example, in the case of the same magnification, the parameter selecting unit 91a reads the line thinning parameter according to the same magnification from the NVM 95, and then, sets the line thinning parameter in the line thinning processing unit 132. Specifically, the filter value and the threshold are set in the edge determination unit 136 in the line thinning determination unit 135; the filter value and the threshold are set in the line thinning suppression determination unit 137 in the line thinning determination unit 135; the table setting values in the case where the line thinning determination identifying signal is "1" are set in the LUT 140a in the edge density conversion unit 140; and the table setting values in the case where the line thinning determination identifying signal is "0" are set in the LUT 140b in the edge density conversion unit 140.

In the case of the enlargement, the parameter selecting unit 91a reads the line thinning parameter according to the enlargement rate from the NVM 95, and then, sets the line thinning parameter in the line thinning processing unit 132. Specifically, the processing is similar to the above-described processing.

In the case of the reduction, the parameter selecting unit 91a reads the line thinning parameter according to the reduction rate from the NVM 95, and then, sets the line thinning parameter in the line thinning processing unit 132. Specifically, the processing is similar to the above-described processing.

When the image data obtained by scanning the document by the scanner unit 4 is input into the image processing device 96, the enlarging/reducing unit 131 performs the enlargement or the reduction based on the enlargement/reduction rate information, and then, outputs the enlarged or reduced image data to the line thinning processing unit 132 (ST4). Incidentally, the image data is output to the next step without any enlargement/reduction in the case of the same magnification.

In the line thinning processing unit 132, the edge determination unit 136 outputs the edge determination identifying signal with respect to the target pixel in the input image data based on the filter value and the threshold set by the parameter selecting unit 91*a*.

Furthermore, the line thinning suppression determination unit 137 outputs the line thinning suppression determining signal with respect to the target pixel in the input image data based on the filter value and the threshold set by the parameter selecting unit 91*a*.

Thereafter, the AND circuit 138 performs the AND calculation between the edge determination identifying signal from the edge determination unit 136 and the line thinning suppression determining signal from the line thinning suppression determination unit 137, and outputs the line thinning determination identifying signal to the edge density conversion unit 140 (ST5).

The edge density conversion unit 140 converts the density of the image data subjected to the arbitrary image processing in the image processing unit 134 in reference to the LUT 140*a* or the LUT 140*b* containing the table setting value set by the parameter selecting unit 91*a* in response to the line thinning determination identifying signal output from the line thinning processing unit 132, and thus, outputs the image data to the printer unit 6 (ST6).

For example, when the value of the line thinning determination identifying signal is "1", it is identified that the target pixel in the image data is the edge. Therefore, the density is converted in reference to the LUT 140*a*. Here, the table setting values set in the LUT 140*a* correspond to the same magnification, the reduction rate and the enlargement rate in the coping operation, as the operation has been already described in step ST3.

In contrast, when the value of the line thinning determination identifying signal is "0", it is identified that the target pixel in the image data is the non-edge. Therefore, the density is converted in reference to the LUT 140*b*.

The LUT 140*b* is referred to in the case where the value of the line thinning determination identifying signal is "0" in the above-described preferred embodiment. However, since it is identified that the target pixel is the non-edge, the input image data may be output as it is without providing any LUT 140*b*.

Alternatively, although the edge density conversion unit 140 is constituted of the two look-up tables, it may be constituted of three or more look-up tables for the same magnification, the enlargement, the reduction and the like.

As described above, in the preferred embodiment according to the present invention, in the case of the reduction, it is possible to make it difficult to determine the edge by adjusting the threshold for use in the edge determination, or it is possible to reduce the line thinning degree by adopting the edge density converting table different from that at the time of the same magnification.

In contrast, in the case of the enlargement, it is possible to make it easy to determine the edge by adjusting the threshold for use in the edge determination, or it is possible to increase the line thinning degree by adopting the edge density converting table different from that at the time of the same magnification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus, comprising:
    a reading unit which reads an image of a document and outputs image data;
    a storage unit which stores a plurality of line thinning arguments;
    a setting unit which sets an enlargement rate or a reduction rate with respect to the image data;
    a selecting unit which selects the line thinning argument corresponding to the enlargement rate or the reduction rate set by the setting unit from the storage unit;
    an enlarging/reducing unit which enlarges or reduces the image data at the enlargement rate or the reduction rate set by the setting unit;
    an edge determination unit which determines as to whether or not the image data is an edge;
    a line thinning suppression determination unit which determines as to whether or not the image data is to be suppressed from line thinning by the use of the line thinning argument selected by the selecting unit;
    a calculating unit which calculates a logical multiplication of a determination result of the line thinning suppression determination unit and a determination result of the edge determination unit;
    a density conversion unit which converts a density of the image data according to a logical calculation result of the calculating unit using the line thinning argument selected by the selecting unit; and
    an image forming unit which forms an image based on the image data undergone density conversion by the density conversion unit.

2. The image forming apparatus according to claim 1, wherein the selecting unit selects individual line thinning arguments in four directions, that is, a main scanning direction, a sub scanning direction and two slantwise directions, respectively.

3. An image processing apparatus, comprising:
    an enlarging/reducing unit which enlarges or reduces image data at a set enlargement rate or a set reduction rate;
    an edge determination unit which determines as to whether or not the image data is an edge;
    a line thinning suppression determination unit which determines as to whether or not the image data is to be suppressed from line thinning by using a selected line thinning argument;
    a calculating unit which calculates a logical multiplication of a determination result of the line thinning suppression determination unit and a determination result of the edge determination unit;
    a density conversion unit which converts a density of the image data according to a logical calculation result of the calculating unit using the selected line thinning argument; and
    an image forming unit which forms an image based on the image data undergone density conversion by the density conversion unit.

4. The image processing apparatus according to claim 3, further comprising a selecting unit that selects individual line thinning arguments in four directions, that is, a main scanning direction, a sub scanning direction and two slantwise directions, respectively.

5. An image forming method, comprising:
- reading an image of a document and outputting image data;
- storing a plurality of line thinning arguments;
- setting an enlargement rate or a reduction rate with respect to the image data;
- selecting the line thinning argument corresponding to the set enlargement rate or the set reduction rate;
- enlarging or reducing the image data at the set enlargement rate or the set reduction rate;
- determining as to whether or not the image data is an edge;
- determining as to whether or not the image data is to be suppressed from line thinning using the selected line thinning argument;
- calculating a logical multiplication of a determination result as to whether or not the image data is to be suppressed from line thinning and a determination result as to whether or not the image data is an edge;
- converting a density of the image data according to a logical calculation result using the selected line thinning argument; and
- forming an image based on the image data undergone density conversion.

6. The image forming method according to claim 5, further comprising selecting individual line thinning arguments in four directions, that is, a main scanning direction, a sub scanning direction and two slantwise directions, respectively.

* * * * *